United States Patent [19]

Brownback

[11] 3,825,926

[45] July 23, 1974

[54] INTERFACING CIRCUITRY FOR CONNECTING A REMOTE KEYBOARD WITH A DATA RECEIVING BUFFER

[75] Inventor: Dewey Earl Brownback, Rochester, Minn.

[73] Assignee: International Business Machines Corporation, Armonk, N.Y.

[22] Filed: Feb. 5, 1973

[21] Appl. No.: 329,955

[52] U.S. Cl. .............................. 340/365 E, 328/42

[51] Int. Cl. .............................. H04l 15/06

[58] Field of Search .............................. 340/365 E

[56] References Cited

UNITED STATES PATENTS

| | | | |
|---|---|---|---|
| 3,675,239 | 7/1972 | Ackerman | 340/365 E |
| 3,750,160 | 7/1973 | Elzinga | 340/365 E |
| 3,760,409 | 9/1973 | Ruben | 340/365 E |

OTHER PUBLICATIONS

EEE, May 1969, pp. 24, 25.

*Primary Examiner*—Thomas B. Habecker
*Attorney, Agent, or Firm*—Keith T. Bleuer

[57] ABSTRACT

Interfacing circuitry connected with a multiplexer activated by keyboard switches and providing an output on the application of a code thereto corresponding with a particular keyboard switch when actuated, the interfacing circuitry including a keyboard counter inhibited in its counting action by an output signal from the multiplexer on depression of one of the keyboard keys and supplying a code to the multiplexer, gating means for gating the content of the counter to a buffer, and delay means for delaying the gating action to the buffer until the expiration of a predetermined time after the raising of an output of the multiplexer. The delay means includes an oscillator driving a decode or counter providing timed successive output signals, and a plurality of flipflops under the control of these timing signals.

3 Claims, 3 Drawing Figures

INTERFACING CIRCUITRY FOR CONNECTING A REMOTE KEYBOARD WITH A DATA RECEIVING BUFFER

BACKGROUND OF THE INVENTION

The invention relates to interfacing circuitry for connecting a remote keyboard with a buffer for transferring data from the keyboard to the buffer.

Circuitry for operatively connecting a keyboard and data receiving buffer has previously been proposed; however, particularly in the case in which the buffer is remotely located with respect to the keyboard, noise on the interconnecting lines has caused erroneous data to be entered into the buffer.

SUMMARY OF THE INVENTION

It is accordingly an object of the present invention to provide an improved interfacing circuitry for connecting the keyboard and buffer incorporating time delay means for rendering the interfacing circuitry immune to the existence of noise on the lines connecting the keyboard and buffer. More particularly, it is an object of the invention to provide such interfacing circuitry which prevents the gating of data collected by a counter in the circuitry actuated on the depression of a key of the keyboard until the expiration of the time delay. Still more particularly, it is an object of the present invention to provide such a time delay means including a decode or counter under the control of an oscillator effective for causing the change in state of a plurality of flipflops.

It is also an object of the present invention to provide interfacing circuitry of this type which will allow key rollover (in which a second key is depressed prior to the release of a first key) without causing erroneous data to be entered into the buffer.

DESCRIPTION OF THE PREFERRED EMBODIMENT

Figure 1:
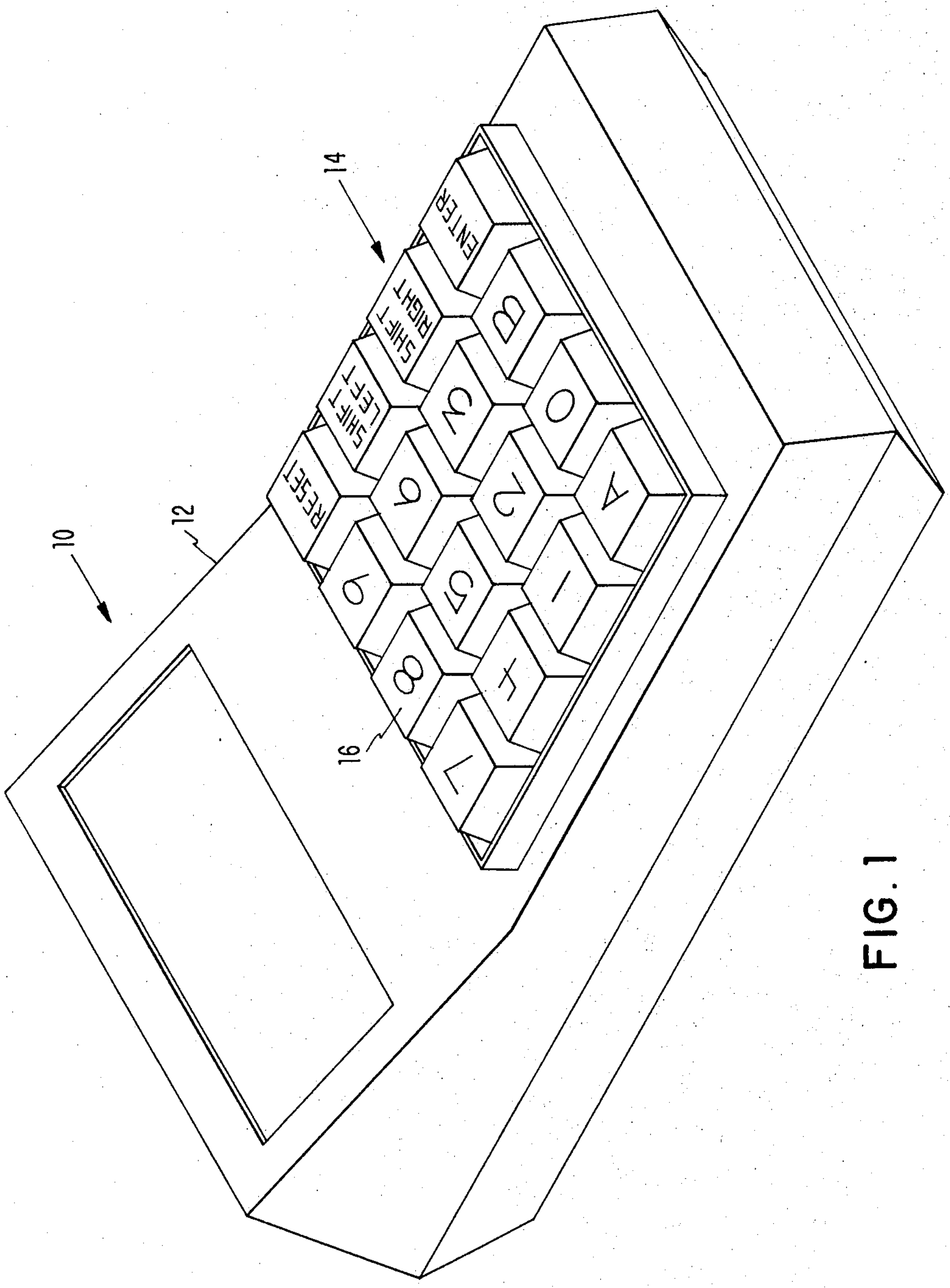
FIG. 1 is a perspective view of a handset that may be used with the interfacing circuitry of the invention.

Referring to FIG. 1, the illustrated handset 10 may be seen to comprise a casing 12 having a keyboard 14 on its face. The keyboard 14 is made up of 16 keys 16 each of which may be manually depressed. Twelve of these keys are "alphanumeric" keys and carry the designations "0, 1, 2, 3, 4, 5, 6, 7, 8, 9, A, B" while the remainder of these keys are function keys carrying such designations as "Enter" and "Reset."

Figure 2A:
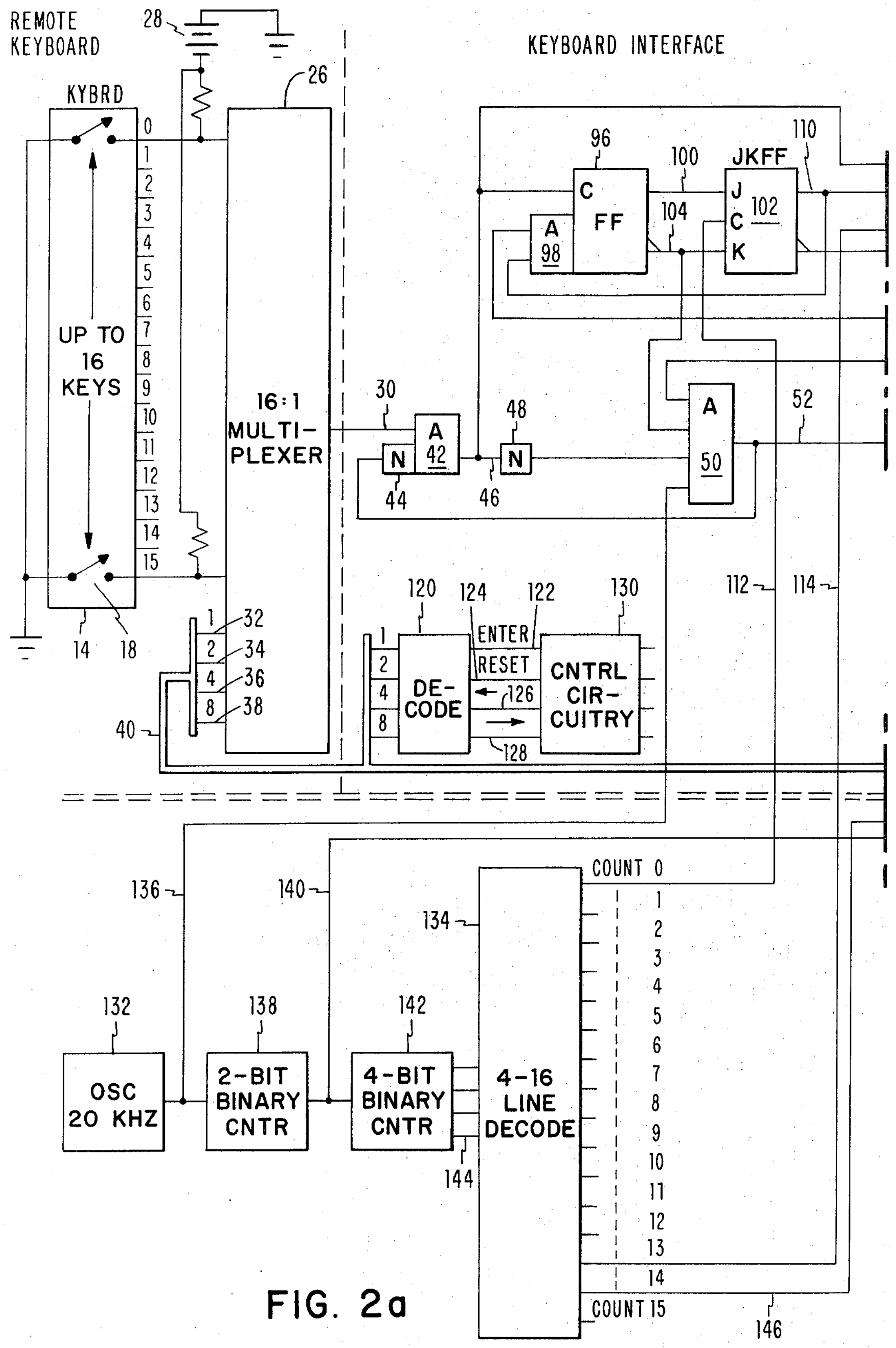
FIGS. 2*a* and 2*b*, when taken together, illustrate schematically the handset connected by means of the interfacing circuitry of the invention with a display and display buffer.
Figure 2B:
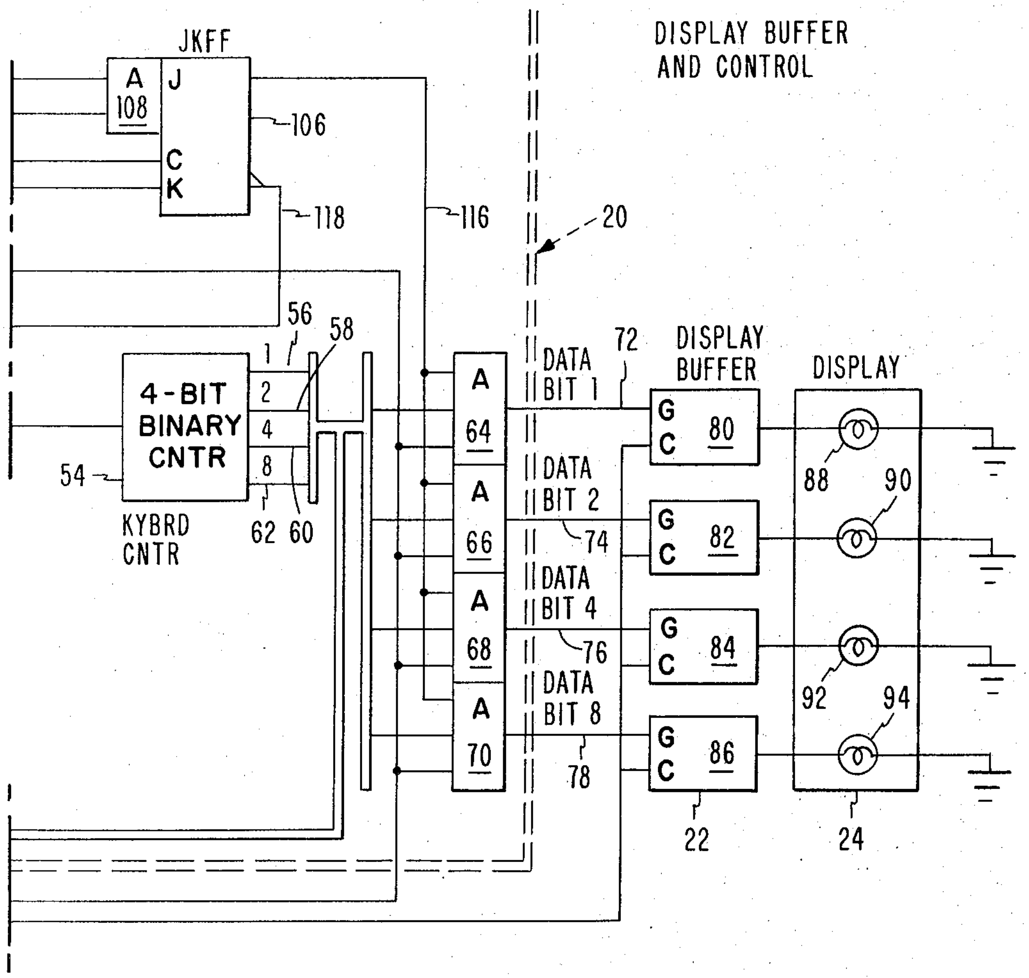

Referring to FIGS. 2*a* and 2*b*, the keyboard 14 is illustrated diagrammatically and includes sixteen switches 18 each of which is closed when the corresponding key 16 is depressed. The interfacing circuitry 20 shown in these figures effectively connects the keyboard 14 with a display buffer 22 and a display 24 as will be hereinafter described in greater detail.

A multiplexer 26 is connected with the sixteen switches 18, and these switches are also grounded as illustrated. The multiplexer 26 along with the switches 18 are contained in the casing 12. A battery 28 or other source of direct current voltage is connected to the connecting leads between the keyboard 14 and the multiplexer 26. The multiplexer has an output lead 30 and has four input leads 32, 34, 36 and 38 from a bus 40. The leads 32, 34, 36 and 38 may be considered to provide respectively binary input bits 1, 2, 4 and 8. The multiplexer 26 is of such a type that it provides a positive output on its output lead 30 only if the four bit code from the bus 40 corresponds to the code for a depressed key 16. For example, if the key marked "6" of the keys 16 is depressed to provide a corresponding output from the keyboard 14 to the multiplexer 26, the binary code from the bus 40 to give an output on the lead 30 must be "0110," respectively on the leads 32, 34, 36 and 38.

The interfacing circuitry 20 includes an AND circuit 42 having an inverter 44 as one of its two inputs. The lead 46 constitutes the output of the AND circuit 42, and the lead 46 is connected to an inverter 48 which in turn is connected as one of the inputs to an AND circuit 50. The AND circuit 50 has an output lead 52 which constitutes the input of the inverter 44, and the lead 52 is connected to be an input to a four bit binary counter 54. The counter 54 has outputs 56, 58, 60 and 62 which may be considered to carry 1, 2, 4 and 8 bit signals and which constitute inputs to the bus 40.

The outputs 56, 58, 60 and 62 of the counter 54 are connected through the bus 40 respectively with AND circuits 64, 66, 68 and 70. These AND circuits respectively have output leads 72, 74, 76 and 78 which, as will hereinafter be described in greater detail, respectively carry data bit 1, 2, 4 and 8 signals. The display buffer 22 has four sections 80, 82, 84 and 86, and these sections are respectively connected with, for example, lamps 88, 90, 92 and 94 in the display 24 and have the leads 72, 74, 76 and 78 as inputs.

A flipflop 96 has the lead 46 as an input to its clock or control terminal, and an AND circuit 98 is appended onto the flipflop 96 at its reset terminal. The positive output terminal of the flipflop 96 is connected by means of a lead 100 with the set terminal of a flipflop 102, and the minus output of the flipflop 96 is connected by means of a lead 104 with the reset terminal of the flipflop 102. A third flipflop 106 has an AND circuit 108 on its set terminal, and this AND circuit has the lead 46 and also a lead 110 as inputs. The lead 110 constitutes the positive output of the flipflop 102. The negative output of the flipflop 102 is connected with the reset terminal of the flipflop 106 as shown. The clock or control input terminals of the flipflops 102 and 106 respectively have leads 112 and 114 connected to them, as shown.

The two flipflops 102 and 106 are of the same type and are set on the trailing edge of a pulse applied to their control input terminals, assuming that there is a signal on the set sides of the flipflops. The flipflop 96 is of a different type and is set when a pulse is applied to its control input terminal, on the leading edge of the pulse.

The positive output of the flipflop 106 is connected by means of a lead 116 with each of the AND circuits 64, 66, 68 and 70 so as to provide inputs thereto; and the negative output of the flipflop 96 is connected to a lead 118 to provide an input to the AND circuit 50.

The interface 20 also includes a decode 120 which has the 1, 2, 4 and 8 signals carried by the bus 40 as inputs; and the decode has output leads 122, 124, 126 and 128. These leads respectively carry "enter," "reset," "shift left," and "shift right," signals as will be hereinafter described in greater detail, and these leads are connected to control circuitry 130 as inputs thereto.

The interface 20 and the display buffer 22 are under the control of a 20 khz oscillator 132 and a 4–16 line decode 134. A lead 136 constitutes the output of the oscillator 132 and also constitutes an input of the AND circuit 50. The lead 136 connects the oscillator 132 with a two-bit binary counter 138, and a lead 140 constitutes the output of the counter 138. The lead 140 also constitutes an input of each of the display buffer sections 80, 82, 84 and 86 and an input to a four bit binary counter 142. The counter 142 has 1, 2, 4 and 8 output leads 144 constituting inputs to the decode 134; and the decode 134 has 16 outputs, three of which are utilized. The three utilized outputs of the decode 134 are the "count zero," the "count 13," and the "count 14" outputs; and these are carried by leads 112, 114 and 146. The leads 112 and 114 are connected to the control terminals of the flipflops 102 and 106 as previously mentioned, and the lead 146 constitutes an input to each of the AND circuits 64, 66, 68 and 70 as well as to the AND circuit 98 appended to the reset side of the flipflop 96.

In operation, the oscillator 132 is in continuous operation and causes a continuous counting action by the four bit binary counter 54, assuming that none of the keys 16 has as yet been depressed. This 20 khz signal is impressed on the counter 54 by means of the lead 136 and AND circuit 50, and the lead 52. At this time, the output of the inverter 48 and also the signals on the leads 118 and 104, constituting the other three inputs of the AND circuit 50, are all positive.

When a key 16 is depressed, the counter 54 continues to run and counts to the code corresponding to the depressed key. As previously mentioned, if key No. 6, for example, is depressed; the binary code corresponding thereto would have to be "0110." Sometime, during the counting action of the counter 54, this binary code is impressed by the counter 54 on the multiplexer 26 through bus 40. The output of the multiplexer 26 on lead 30 then goes positive. Thereafter, as soon as the output of the 20 khz oscillator 132 on lead 136 goes negative, the output of the AND circuit 50 is negative so that both inputs of the AND circuit 42 are satisfied. A positive signal thus exists on lead 46. Inverter 48 then applies a negative signal on AND circuit 50 disabling AND circuit 50 and providing a minus or low output on lead 52 so that the counter 54 is disabled and has no further counting action at this time. The counter 54 then contains a count corresponding to the particular key 16 that was depressed. In addition, flipflop 96 is set at this time by the positive signal on lead 46.

The 4–16 decode 134 is under the control of the oscillator 132 through the 2 bit binary counter 138 and the four bit binary counter 142. The decode 134 thus provides, successively, count 0, count 1, count 2 . . . count 13, count 14 and count 15 signals.

After the flipflop 96 is set, providing a signal on its output lead 100 and applied to the set terminal of the flipflop 102, flipflop 102 is set when a count zero signal appears on lead 112 from the decode 134. The flipflop 102 thus provides a signal on its output lead 110 applied to the AND circuit 108 enabling AND circuit at this time since a positive signal exists on lead 46. The flipflop 106 is thus set at the subsequent count 13 signal from decode 134 present on lead 114, assuming that the key 16 is still depressed. For flipflop 106 to be thus set, the key 16 must therefore remain depressed for at least 13 cycles of operation of the decode 134 (between count 0 and count 13) or 2.6 milliseconds. If the key 16 is released during these 13 cycles, AND circuit 108 will not be satisfied when the count 13 signal occurs, and the flipflop 106 will not be set. As will be apparent, the flipflop 102 may be set from 0 to 16 counts of the decode 134 after the flipflop 96 is set, and the flipflop 106 is set 13 counts after the flipflop 102 is set, the difference in the time of setting of the flipflops 102 and 106 accounting for the 2.6 milliseconds.

The AND circuits 64, 66, 68 and 70 are enabled immediately after the setting of the flipflop 106, since the output signal on lead 116 from flipflop 106 and also the count 14 signal on lead 146 are applied as inputs to these AND circuits. These AND circuits transmit the 1, 2, 4 and 8 data bits remaining in the counter 54 to the display buffer 22 and in particular to the portions 80, 82, 84 and 86 of the buffer 22, these data bits corresponding to the particular key 16 that was depressed initially to stop the counter 54. If the key 16 is released before the expiration of the 2.6 millisecond period above mentioned; the signal on lead 46 ceases; AND circuit 108 is not satisfied when the count 13 signal occurs; AND circuits 64, 66, 68 and 70 are not satisfied; and the contents of counter 54 is not transferred to buffer 22. The lamps 88, 90, 92 and 94 are lighted from the contents of the buffer portions 80, 82, 84 and 86 to indicate the particular key 16 that was depressed. Obviously, these signals applied to the display may be used for any other desired purposes. The 2 bit binary counter 138 provides an output signal on lead 140 of 5 khz, and this signal is used for gating the data bit signals on leads 72, 74, 76 and 78 into the buffer portions 80, 82, 84 and 86.

The flipflop 96 is reset by the count 14 signal on lead 146 at the same time that data is gated as just mentioned into the display buffer 22. The flipflops 102 and 106 are therefore reset at the following count 0 and count 13 signals from the decode 134 which are applied to these flipflops by means of the leads 112 and 114. The AND circuit 50 may thus be enabled with this resetting of these flipflops, since under these conditions positive signals exist on leads 104 and 118.

If another key 16 is depressed while the first key 16 remains depressed, there will be no change in output of the multiplexer 26 on output lead 30, since the multiplexer 26 is inherently of such construction as to provide this result. There is accordingly, no change in the buffer 22 and display 24 at this time. Just as soon as the first key 16 is released, the multiplexer output signal on lead 30 goes negative, and AND circuit 50 is again satisfied to cause the 4 bit binary counter 54 to again count. This is assuming that the flipflops 96, 102 and 106 are reset as has just been described. The multiplexer 26 will again provide a positive signal on its output lead 30 when the bus 40 provides the proper code to the leads 32, 34, 36 and 38 corresponding to the new key 16 that has been depressed; and the same transfer of data to the display buffer 22 takes place as a result of the second key 16 as has been described in connection with the first key 16.

The transfer of data to the display buffer 22 as just described, is particularly for those of the keys 16 having an alphanumerical designation. With respect to the others of the keys 16, a transfer from the bus 40 to the decode 120 takes place; and this data is used for any suitable purposes, such as by the control circuitry 130.

The 20 khz frequency is used in connection with the keyboard 14 so as to reduce the maximum time required for keeping a key 16 depressed, and the lower 5 khz signal from the 2 bit binary counter 138 is more suitable to provide a 200 hz refresh rate for the display buffer 22. These frequencies for each of these functions are not critical.

As has been above described, the data from the counter 54 corresponding to the particular key 16 that has been depressed is not gated into the display buffer 22 until at least 2.6 milliseconds has expired after a signal appears on the output line 30 of the multiplexer 26 on a depression of the key 16. This delay, as previously described, is because of the action of the decode 134 acting as a counter in connection with the flipflops 102 and 106. The system is therefore quite insensitive to the noise on the line 30 and also to the effect of bounce of the switches 18 tending to cause a varying signal on the line 30. This is due particularly to the action of the AND circuit 108 which need only have a signal from multiplexer 26 when the delayed count 13 signal occurs in order to be effective to set flipflop 106 and gate data from counter 54 to buffer 22. In addition, it will be observed that the interconnection lines (line 30 and the four lines in bus 40) required to connect the remote keyboard 10 and the interface 20 are minimized in number. The handset 10 may be separated from the circuitry 20 by quite a distance, such as, for example, 50 feet. The system requires only the multiplexer 26 in the same casing 12 as the keyboard 14, and advantageously a minimum amount of hardware is required at the remote location of the keyboard. Advantageously, the counter provided by the decode 134 not only functions as a part of delay mechanism for eliminating the results of switch bounce and noise on line 30; but, in addition, the counter actuates the gate (AND circuits 64, 66, 68 and 70) for loading the character keyed into the buffer 22 after expiration of the 2.6 millisecond period. In addition, if desired, this counter can also be used as a clock for other functions in a system of which the illustrated mechanism forms a part.

The multiplexer 26 which provides a continuing signal on its output as long as the input from one of the switches 18 continues, even though the input from another switch 18 raises during this time, is a standard unit obtainable from a number of sources, being model 74150 obtainable from Texas Instruments, of Dallas, Texas, and Motorola Incorporated of Phoenix, Arizona. The flipflops 102 and 106 are also standard units, being model 7473 obtainable from these sources also. Flipflop 96 is also a standard unit being model 7474 obtainable from these sources.

What is claimed is:

1. Data transferring circuitry including a keyboard with a plurality of keys and key actuated switches, buffing means for holding data corresponding to one of said keys and its associated switch, a multiplexer having an input connected to each of said switches and having a control set of inputs to which encoded data is supplied so as to provide an outpu when data supplied to the latter inputs correspond to one of said keys and key actuated switches, a counter providing a coded output on a plurality of output lines and connected to said control set of inputs, an oscillator for driving said counter, means connecting said multiplexer and said counter for stopping said counter when said multiplexer has an output, gating means for gating said counter to said buffering means so that, when said gating means is open, the contents of said counter is supplied to said buffering means, and delay means having a first input connected with the output of said multiplexer and having an output connected to said gating means to control the gating means and rendered operative when said multiplexer has an output applied to said first input to be effective after a predetermined delay time after thus being rendered operative for causing said gating means to open to gate the contents of said counter to said buffering means with said counter being stopped, said delay means including a second input connected to the output of said multiplexer and including means under control of a signal on said second input for thereby sampling the output of said multiplexer at the end of said delay time for rendering the delay means effective on said gating means to gate the contents of said counter to said buffering means only if an input is supplied to said second input at the end of said delay time.

2. Data transferring circuitry as set forth in claim 1, said delay means including first and second bi-stable devices and clocking means providing two timewise spaced clocking signals respectively applied to said first and second bi-stable devices for controlling these bi-stable devices, said first bi-stable device being under the control of the earlier one of said clocking signals and of a signal on said first input, said second bi-stable device being connected to said gating means to control the gating means and being controlled by the later one of said clocking signals, said sampling means including a control circuit connected to said second input of said delay means and also to the output of said first bi-stable device and controlling said second bi-stable device.

3. Data transferring circuitry as set forth in claim 2, said delay means including a third bi-stable device connected to said first input of said delay means and thereby to the output of said multiplexer and having its output connected to said first bi-stable device for controlling the latter, said clocking means including a decode driven by said oscillator and providing as outputs said clocking signal which are connected to said first and second bi-stable devices respectively, said control circuit for said second bi-stable device including an AND circuit connected with said second input of said delay means and also with the output of said first bi-stable device.

* * * * *